United States Patent [19]
Cabet et al.

[11] 3,873,774

[45] Mar. 25, 1975

[54] EQUIPMENT FOR THE DETECTION AND EXTRACTION OF A TELEGRAPH CHANNEL

[75] Inventors: Alain Cabet, Paris; Gaston Pinier, Longjumeau; Guy Eloy, Bagneux, all of France

[73] Assignee: Compagnie Industrielle Des Telecommunications Cit-Alcatel, Paris, France

[22] Filed: June 27, 1973

[21] Appl. No.: 373,912

[30] Foreign Application Priority Data

June 27, 1972 France ............................. 72.23211

[52] U.S. Cl. .......................... 179/15 BF, 179/15 FD

[51] Int. Cl. ............................................. H04j 1/16

[58] Field of Search ....... 179/15 BF, 15 BY, 15 FD, 179/15 FS, 41 A, 18 EG, 18 F, 15 A, 2 DP, 3, 4; 178/50, 66 R

[56] References Cited

UNITED STATES PATENTS

| | | | |
|---|---|---|---|
| 2,479,701 | 8/1949 | Ress | 179/41 A |
| 3,548,105 | 12/1970 | Anderson | 179/15 BF |
| 3,691,306 | 9/1972 | Mold | 179/15 BF |
| 3,748,398 | 7/1973 | Schenkel | 179/41 A |

*Primary Examiner*—William C. Cooper
*Assistant Examiner*—Thomas D'Amico
*Attorney, Agent, or Firm*—Craig & Antonelli

[57] ABSTRACT

Equipment for detecting, on the basis of two consecutive tests, the existence of one or several telegraph channels on one or several telephone channels of a frequency multiplex system. The first test, which is relatively fast, is based on the presence of a predetermined frequency in the channel. The second test, which is slower in operation, is based on the amplitude identity of two moments, formed by alternate transitions in the transmission signal.

10 Claims, 3 Drawing Figures

EQUIPMENT FOR THE DETECTION AND EXTRACTION OF A TELEGRAPH CHANNEL

The present invention pertains to the field of transmission of voice-frequency telegraphy on a telephone channel. It is concerned with and directed to equipment which makes it possible to detect, with respect to simple and sure criteria, the existence of one or several telegraph channels on one or several telephone channels of a frequency multiplex system. It is applied to the operation of one group of a transmission system, for example a secondary group.

The present invention affords a solution to the following problem. What is involved, in a system of frequency multiplex transmission, for example in a secondary group of 60 telephone channels which are susceptible of being used in telegraphy, is to detect the channels which transmit the telegraphy data, and to extract and furnish for the telegraphic operation the data transmitted on these channels. Hence, the problem is three-fold:

1. The secondary group must be subjected to a permanent scanning channel by channel.

2. The equipment must test each telegraphic channel explored in accordance with certain criterion to determine either "telegraphy present," or "absence of telegraphy."

3. In the first case (telegraphy present), the telegraphic channel affected must be extracted and furnished to the telegraphy operation, while in the second case (absence of telegraphy), the scanning must continue.

Moreover, the detection and extraction of a telegraphic channel existing in the group must be made within as short a period of time as possible so that no significant amount of telegraphic data will be lost. This requirement leads one to carry out the decision in two stages.

During the systematic scanning of the group, there is applied to each telegraphic channel a first, so-called rapid, test which characterizes with certainty any channel used in telegraphy, but which equally comprises a certain possibility that telephone channels are involved. If a telegraph channel satisfies this first rapid test, the scanning is stopped on this channel and the channel is thereupon subjected to a second, slower test. If this second test is satisfied, there is practically the certainty that the channel affected transmits telegraphy. The telegraph channel is then extracted and delivered to the telegraphic operation.

The scanning member or analyzer is stopped on a channel which satisfies or meets the first test. If the second test is not satisfied, or met, the analyzer resumes its scanning. But if the second test is indeed satisfied or met, the analyzer remains locked on the detected telegraph channel as long as it transmits telegraphy.

The number of channels which may be used in telegraphy is not limited as a matter of principle. The complete equipment thus comprises several unitary members.

The first test is based on the following conditions. Since any telegraph channel is transposed by the analyzer into a fixed channel, Fo ±30 Hz, one will obtain between two transitions either the frequency Fo + 30 Hz or the frequency Fo − 30 Hz, but not both of these frequencies at the same time. This set of circumstances is generally not found in a telephone transmission. It therefore represents a strong presumption of a telegraph channel. The application of this test requires about 20 milliseconds.

It may happen, coincidentally, that a telephone channel may satisfy the conditions of this first test, for example, a telephone channel on which a fixed tone might be emitted for a certain period of time might satisfy the frequency test. This is the reason why the decision taken in accordance with the first test must be confirmed by a second test corresponding more specifically to a telegraphic transmission. In a telegraphic transmission, a signal is obtained after a transition (transition No. 1) which has a certain polarity, 0 or 1. After two transitions following the first (transition No. 3), the same polarity should be found again. This set of circumstances defines a telegraphic transmission without ambiguity. The application of this second test requires a maximum of 140 milliseconds.

The equipment in accordance with the invention thus comprises an analyzing device transposing, by systematic scanning of a secondary group, each telegraph channel into a fixed channel Fo ± 30 Hz (with Fo = 1740 Hz, for example); a telegraphy detector I based on the test of simultaneous non-occupation of the two side-bands; a telegraphy detector II based on the identity of the signal characteristic after a first transition and after a third transition; and attendant circuits assuring the stopping of the scanning on a channel which meets the first test concerning frequency, and the extraction of the telegraph channel if the second test concerning polarity is also met, or the resumption of the scanning in the case to the contrary.

An equipment such as proposed by the present invention will now be described in further detail hereunder with reference to the accompanying drawing, wherein FIG. 1 is a schematic diagram of the unit or group equipment proposed by the present invention;

Figure 1:
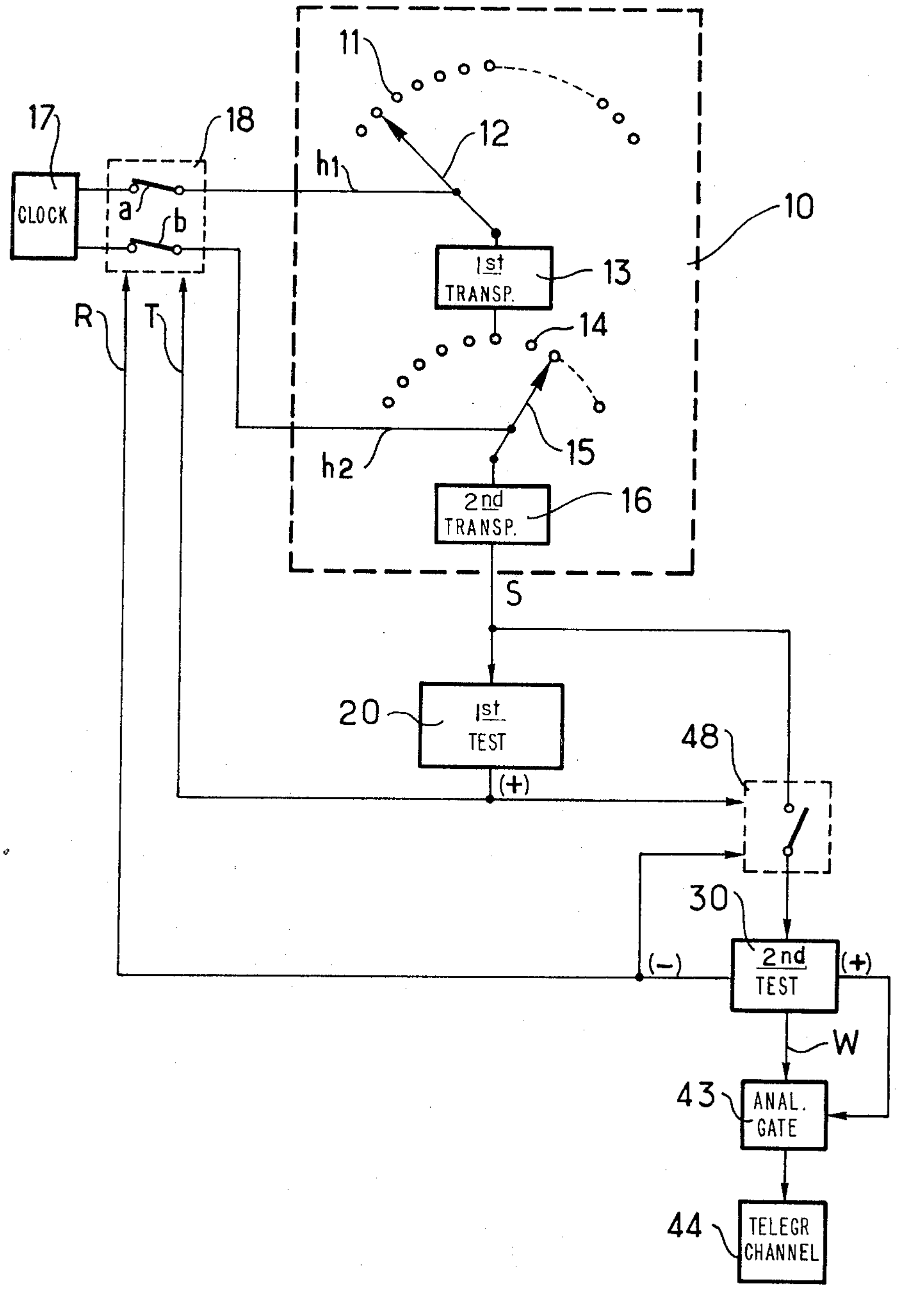

As seen in FIG. 1, an analyzer 10 performs a step-by-step scan of the channels of a group of channels to be monitored, for example, the sixty telephone channels of a secondary group covering 312–552 kHz connected to the respective terminals 11.

The exploration or scanning, symbolically indicated by a commutator slide contact 12, furnishes by the use of a known circuit 13, made up of a variable oscillator, modulator and filter, a channel of 4 kHz (for example, 24–28 kHz), which may be subdivided into 24 telegraphic channels 14. The channels 14 may be analyzed in turn by known selecting means 15 in the form of a commutator slide contact and transposition means 16 furnishing at the output a fixed channel, Fo ± 30 Hz (signal S).

A clock 17 applies to the analyzer 10 clock signals *h*1 (recurrence period 600 ms) for the selection of a telephone channel and *h*2 for the selection of a telegraph channel (recurrence period 25 ms). The clock signals *h*1 and *h*2 are applied to the commutators 11, 12, and 14, 15, respectively, through two rest contacts *a* and *b* of a double interrupter 18. This interrupter 18 opens when it receives a work control command T, and it closes when it receives a rest control command R.

The first telegraphy detector 20 receives the signal S from the analyzer 10. If the signal S does not meet or satisfy the first test, nothing happens; the scanning continues due to the command of the clock signals *h*1 and *h*2. If the first test is met, which is indicated by the + sign at the output of the member 20, a work command T is applied to the double interrupter 18, and the scanning stops. At the same time, a work command T is applied to a work contact of an interrupter 48 which closes and then applies the signal S to the second telegraphy detector 30.

If the member 30 detects a telegraph transmission, which is indicated by a + sign at one output of the member 30, the telegraphic signal W issuing from the member 30 is applied by means of an analog gate 43 to a member for operating the telegraphy equipment 44. If the member 30 does not detect a telegraph transmission, voiding the decision of the member 20, which is indicated by a − sign at another output of the member 30, the latter sends a rest command R to the interrupter 48 and a rest command R to the double interrupter 18, and scanning is initiated once again.

Figure 2:
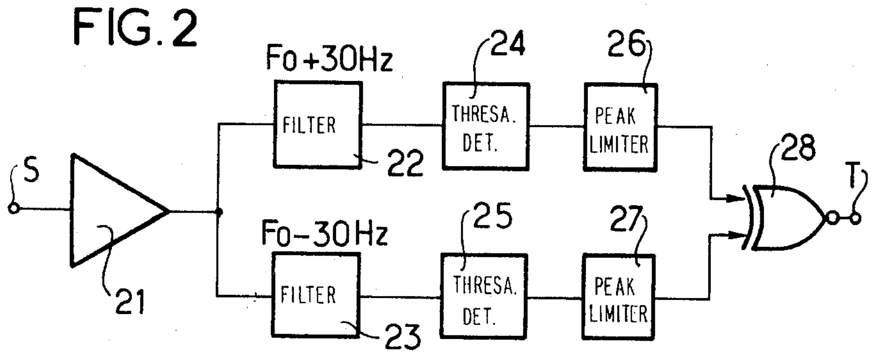
FIG. 2 is a schematic diagram of a first telegraphy detector.

As seen in FIG. 2, the first telegraph detector 20 comprises an amplifier 21, which receives the signal S. The output of the amplifier 21 is subdivided into two branches. On one of these branches there is disposed a band pass filter 22 with a narrow band Fo + 30 Hz in series with a threshold detector 24 and a peak limiter 26, On the other branch there is disposed in series a narrow-band filter 23 centered on Fo − 30 Hz, a threshold detector 25, and a peak limiter 27. The output signals from the peak limiters 26 and 27 are applied to the two inputs of an EXCLUSIVE OR logic circuit 28, which furnishes at the output a signal T = 1 if there is detection of a telegraphy transmission. As a matter of fact, if there is telegraphy data in the channel being scanned, the two frequencies Fo ± 30 Hz are not concomitant, and therefore the EXCLUSIVE OR circuit 28 will furnish a 1 at the output.

Figure 3:
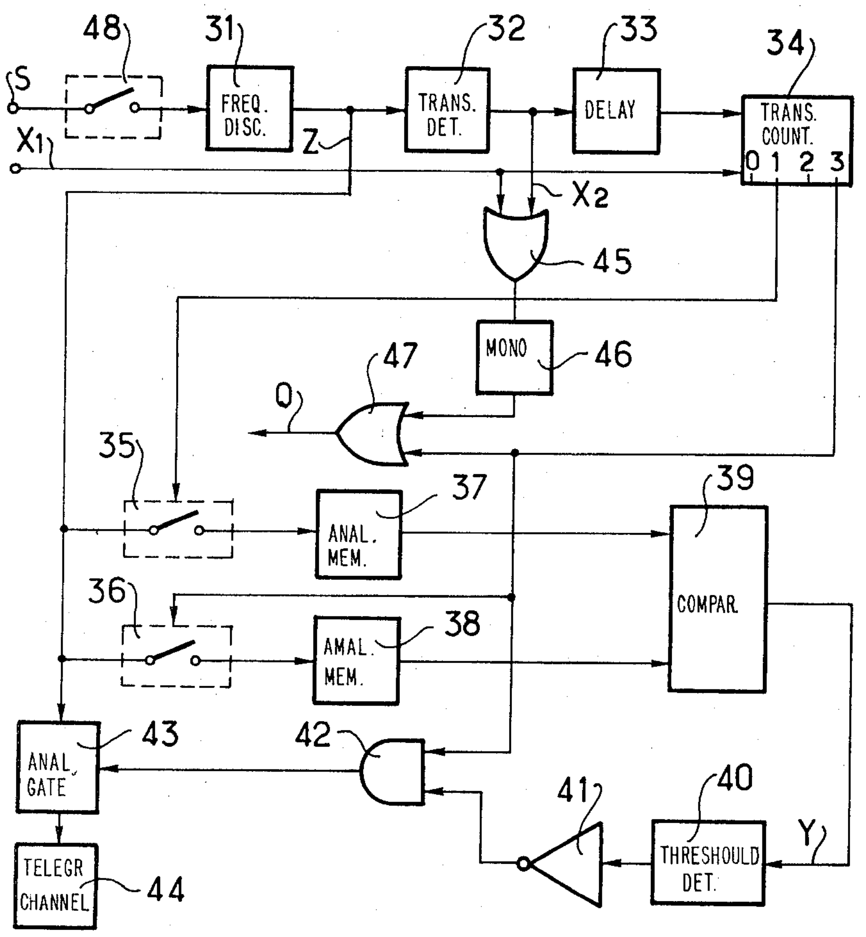
FIG. 3 is a schematic diagram of a second telegraphy detector, also serving as telegraph channel extractor.

FIG. 3 illustrates the second detector 30. The signal S is applied by the interrupter 48, which has been previously closed by a work command T coming from the telegraphy detector 20, to a frequency discriminator 31, covering the band Fo ± 30 Hz. The frequency discriminator 31 is connected to a transition detector 32, which may be of any known type. Placed at the output of the transition detector 32 is a delay member 33 having a duration in the order of 10 ms, which is provided in expectation of the operating condition after the passage of a transition. A counter 34 modulo 4 counts the delayed transitions received from delay member 33.

The counter 34 is reset to zero by a signal $X_1$ for beginning the measuring. When the first transition arrives, the counter 34 is advanced to a count of 1, and this condition has the effect of closing an interrupter 35 which applies the output signal Z of the frequency discriminator 31 to a first analog memory 37. When the third transition arrives on the counter 34, the counter is advanced to a count of 3, and this condition has the effect of closing an interrupter 36 which applies the signal Z to a second analog memory 38. The two analog memories 37 and 38 may be formed advantageously by respective capacitors on which a charge is accumulated with low losses in a manner well known.

The memories 37 and 38 are connected to the inputs of a comparator 39 having a high input impedance. The output signal Y of the comparator 39 is applied to a threshold detector 40, operating on the threshold Uo, followed by an inverter 41. A coincidence AND gate 42 receives on a first input thereof the output of the inverter 41, and on a second input a signal representing the count 3 of the counter 34. If Y is smaller than Uo, the threshold 40 applies a logic zero to the inverter 41 which applies a 1 to the gate 42. The gate 42 is conductive on the condition of count 3 of the counter 34. If Y is greater than Uo, the AND gate 42 is blocked. For Y < Uo, the output signal of the AND gate 42 may therefore open an analog gate 43 (possibly closing an interrupter) which, in the conductive condition, applies this signal Z to a telegraphic operating member 44, for example, a functional telegraphic unit.

In the presence of a telegraphic signal, the maximum time which may elapse without transition is 120 ms, the interval between the end of a start signal and the beginning of a stop signal. A reference delay time fixed or established at approximately 125 ms is furnished by a monostable flip-flop 46. The monostable flip-flop 46 is set with a signal $X_1$ for beginning measuring, or reset by a signal $X_2$ coming from the output of the transition detector 32 through an OR circuit 45. A signal Q is provided for ending the measuring operation through an OR circuit 47 which also receives the condition of count 3 of the counter 34.

The signal for ending the measuring operation is thus emitted if there is no occurrence of a transition in an interval of 125 ms after the first transition. If there is a transition during this interval, the monostable flip-flop 46 is retained in the set state. The signal Q for ending the measurement is emitted either by the resetting of the monostable flip-flop 46, or by the condition of count 3 of the transition counter 34.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A system for detecting and extracting a telegraph transmission from a frequency multiplex telephone transmission system including a plurality of telephone channels, comprising analyzer means for analyzing said telephone channels including scanning means for scanning said telephone channels and means for transposing the transmission on each telephone channel susceptible of carrying a telegraph transmission into a fixed channel Fo ± 30 Hz, first telegraphy detector means connected to the output of said analyzer means for generating a signal upon detecting one of the sidebands of said fixed channel, means for stopping said scanning means in response to said signal from said first telegraphy detector means, second telegraphy detector means for detecting a polarity characteristic of a transmission which identifies it as a telegraph transmission, and means responsive to said signal from said first telegraphy detector means for connecting said second telegraphy detector means to the output of said analyzer means, said second telegraphy detector means including means for overriding said stopping means upon failure to detect said polarity characteristic of the channel, thereby permitting said scanning means to resume operation.

2. A system according to claim 1, characterized in that said first telegraphy detector means comprises a first branch receiving the output of said analyzer means and containing a bandpass filter centered on Fo + 30 Hz, a threshold detector and a peak limiter in series, a second branch receiving the output of said analyzer means and containing a band-pass filter centered on Fo-30 Hz, a threshold detector and a peak limiter in series, and an EXCLUSIVE OR circuit connected to receive the outputs of said first and second branches.

3. A system according to claim 1, characterized in that said second telegraphy detector means contains a frequency discriminator connected to a telegraphic transition detector, a delay circuit connected to the output of said transition detector, a modulo 4 counter connected to the output of said delay circuit, a first analog memory selectively connected to the output of said frequency discriminator under the control of said counter at the time of a first counting state thereof, a second analog memory selectively connected to the output of said frequency discriminator under the control of the said counter at the time of a second counting state thereof, a comparator connected to the outputs of said first and second analog memories, and threshold detector means connected to the output of said comparator for applying the output signal of said frequency discriminator to a telegraphic operation member if the output of said comparator is lower than a reference value.

4. A system according to claim 3, characterized in that the second telegraphy detector means also contains timing means including a monostable flip-flop connected to the output of said transition detector for generating a signal for the end of the measuring operation, if said monostable flip-flop has remained set for a predetermined period of time without being reset by the output of the transition detector.

5. A system as defined in claim 4 wherein said first and second counting states of said counter are separated by two counts.

6. A system as defined in claim 5 wherein said first and second counting states of said counter are the first and third counts of the delay output of said transition detector.

7. A system according to claim 4, characterized in that said first telegraphy detector means comprises a first branch receiving the output of said analyzer means and containing a band-pass filter centered on Fo + 30 Hz, a threshold detector and a peak limiter in series, a second branch receiving the output of said analyzer means and containing a band-pass filter centered on Fo-30 Hz, a threshold detector and a peak limiter in series, and an EXCLUSIVE OR circuit connected to receive the outputs of said first and second branches.

8. A method for detecting a telegraphic transmission formed of a series of signal transitions on one or more of a plurality of telephone channels in a frequency multiplex telephone system comprising:

transposing the transmission on each channel susceptible of carrying a telegraphic transmission into a fixed channel of frequency Fo ± 30 Hz, scanning said transposed channels in sequence, detecting one of the sidebands of said fixed channel of each channel scanned, and detecting in each channel where one of said sidebands is detected a repetition of the same polarity in alternate transitions in the transmission.

9. A method as defined in claim 8, further including the steps of stopping said scanning in response to detecting one of said sidebands in the scanned channel and continuing to stop said scanning in response to detecting said repetition of the same polarity in alternate transitions.

10. A method as defined in claim 9, further including the step of resuming said scanning in response to failure to detect said repetition of the same polarity in alternate transitions.

* * * * *